United States Patent
Morikami

(10) Patent No.: US 10,780,624 B2
(45) Date of Patent: Sep. 22, 2020

(54) METHOD OF MANUFACTURING CONTAINER BY LIQUID BLOW MOLDING

(71) Applicant: YOSHINO KOGYOSHO CO., LTD., Tokyo (JP)

(72) Inventor: Shigeki Morikami, Tokyo (JP)

(73) Assignee: YOSHINO KOGYOSHO CO., LTD., Tokyo (JP)

(*) Notice: Subject to any disclaimer, the term of this patent is extended or adjusted under 35 U.S.C. 154(b) by 107 days.

(21) Appl. No.: 16/315,038

(22) PCT Filed: May 29, 2017

(86) PCT No.: PCT/JP2017/019959
§ 371 (c)(1),
(2) Date: Jan. 3, 2019

(87) PCT Pub. No.: WO2018/016187
PCT Pub. Date: Jan. 25, 2018

(65) Prior Publication Data
US 2019/0308364 A1    Oct. 10, 2019

(30) Foreign Application Priority Data

Jul. 22, 2016   (JP) ................................. 2016-144717

(51) Int. Cl.
*B29C 49/46* (2006.01)
*B29C 49/48* (2006.01)
(Continued)

(52) U.S. Cl.
CPC .............. *B29C 49/46* (2013.01); *B29C 49/42* (2013.01); *B29C 49/421* (2013.01); *B29C 49/48* (2013.01);
(Continued)

(58) Field of Classification Search
CPC ... B29C 2049/465; B29C 49/70; B29C 49/42; B29C 49/421
See application file for complete search history.

(56) References Cited

U.S. PATENT DOCUMENTS

| | | | | |
|---|---|---|---|---|
| 3,830,360 A | * | 8/1974 | Graff | ...................... B65G 47/82 198/409 |
| 4,125,583 A | * | 11/1978 | Fischer | ................. B29C 49/421 198/448 |

(Continued)

FOREIGN PATENT DOCUMENTS

| | | |
|---|---|---|
| CN | 204714498 U | 10/2015 |
| CN | 105121129 A | 12/2015 |

(Continued)

OTHER PUBLICATIONS

Feb. 12, 2020 Extended Search Report issued in European Patent Application No. 17830707.0.
(Continued)

*Primary Examiner* — Leith S Shafi
*Assistant Examiner* — Nicholas J Chidiac
(74) *Attorney, Agent, or Firm* — Oliff PLC

(57) ABSTRACT

A method of manufacturing a container by liquid blow molding includes: a liquid blow molding step of supplying a pressurized liquid to inside of a preform placed in a mold, and molding the preform into a container body containing the liquid; a placement step of placing the container body in a cup for containing a bottom part of the container body, at a mold opening position of the mold; and a conveyance step of conveying the cup holding the container body from the mold opening position to a capping position.

4 Claims, 7 Drawing Sheets

(51) Int. Cl.
    *B29C 49/70*     (2006.01)
    *B29C 49/42*     (2006.01)
    *B29L 31/00*     (2006.01)

(52) U.S. Cl.
    CPC ...... *B29C 49/70* (2013.01); *B29C 2049/4602* (2013.01); *B29L 2031/7158* (2013.01)

(56) References Cited

U.S. PATENT DOCUMENTS

| | | | | |
|---|---|---|---|---|
| 5,022,511 | A * | 6/1991 | Gorrieri | B65G 43/08 198/460.1 |
| 5,681,597 | A * | 10/1997 | Aguilar | B29C 49/421 198/471.1 |
| 5,865,292 | A * | 2/1999 | Aguilar | B29C 49/421 198/408 |
| 6,923,933 | B2 * | 8/2005 | Fiorani | B29C 49/421 264/334 |
| 8,431,068 | B2 * | 4/2013 | Hansen | B29C 49/4817 264/534 |
| 10,065,358 | B2 * | 9/2018 | Diesnis | B29C 49/4205 |
| 10,569,913 | B2 * | 2/2020 | Voth | B65B 31/025 |
| 2010/0068328 | A1 * | 3/2010 | Parrinello | B29C 43/34 425/525 |
| 2015/0284115 | A1 * | 10/2015 | Voth | B65B 31/022 53/453 |
| 2016/0001491 | A1 | 1/2016 | Desoutter et al. | |
| 2016/0059469 | A1 | 3/2016 | Diesnis et al. | |
| 2016/0250798 | A1 * | 9/2016 | Diesnis | B65B 43/54 425/524 |

FOREIGN PATENT DOCUMENTS

| | | |
|---|---|---|
| EP | 2 930 005 A1 | 10/2015 |
| JP | 2016-032921 A | 3/2016 |
| WO | 2015/091565 A1 | 6/2015 |

OTHER PUBLICATIONS

Mar. 17, 2020 Office Action issued in Japanese Patent Application No. 2016-144717.

Jan. 22, 2019 International Preliminary Report on Patentability issued in International Patent Application No. PCT/JP2017/019959.

Jun. 20, 2017 International Search Report issued in International Patent Application No. PCT/JP2017/019959.

May 8, 2020 Office Action issued in Chinese Patent Application No. 201780040530.0.

* cited by examiner

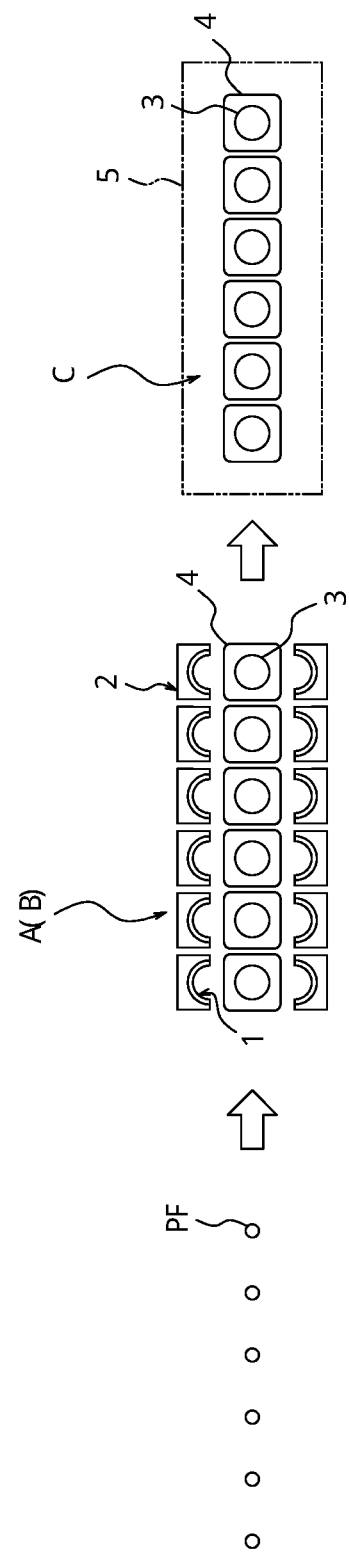

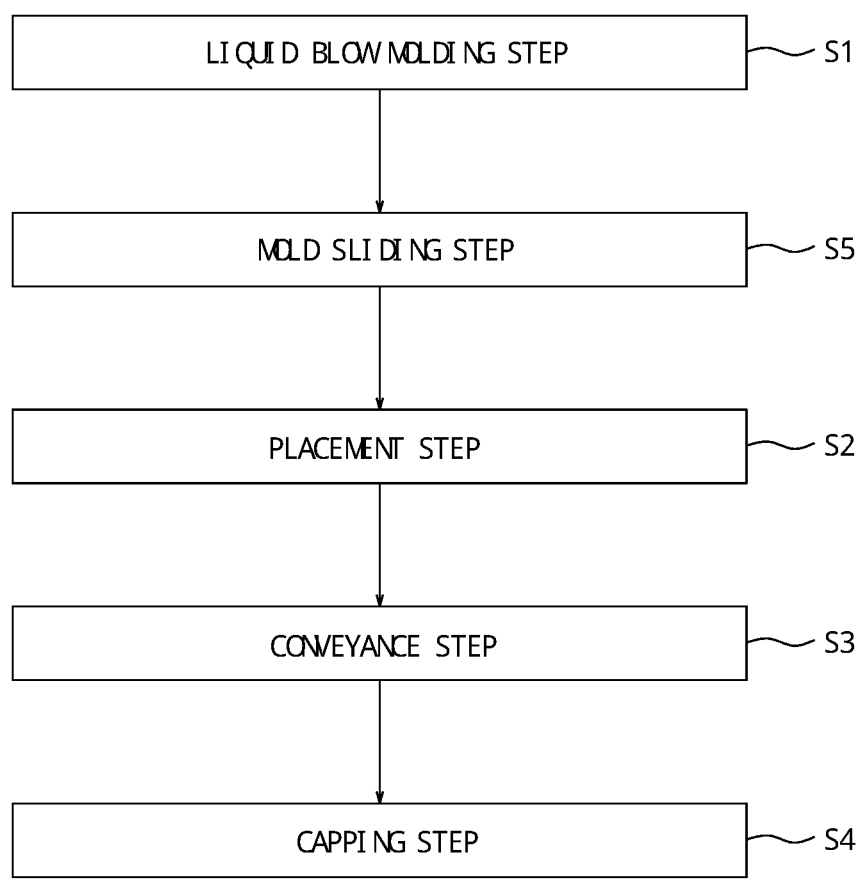

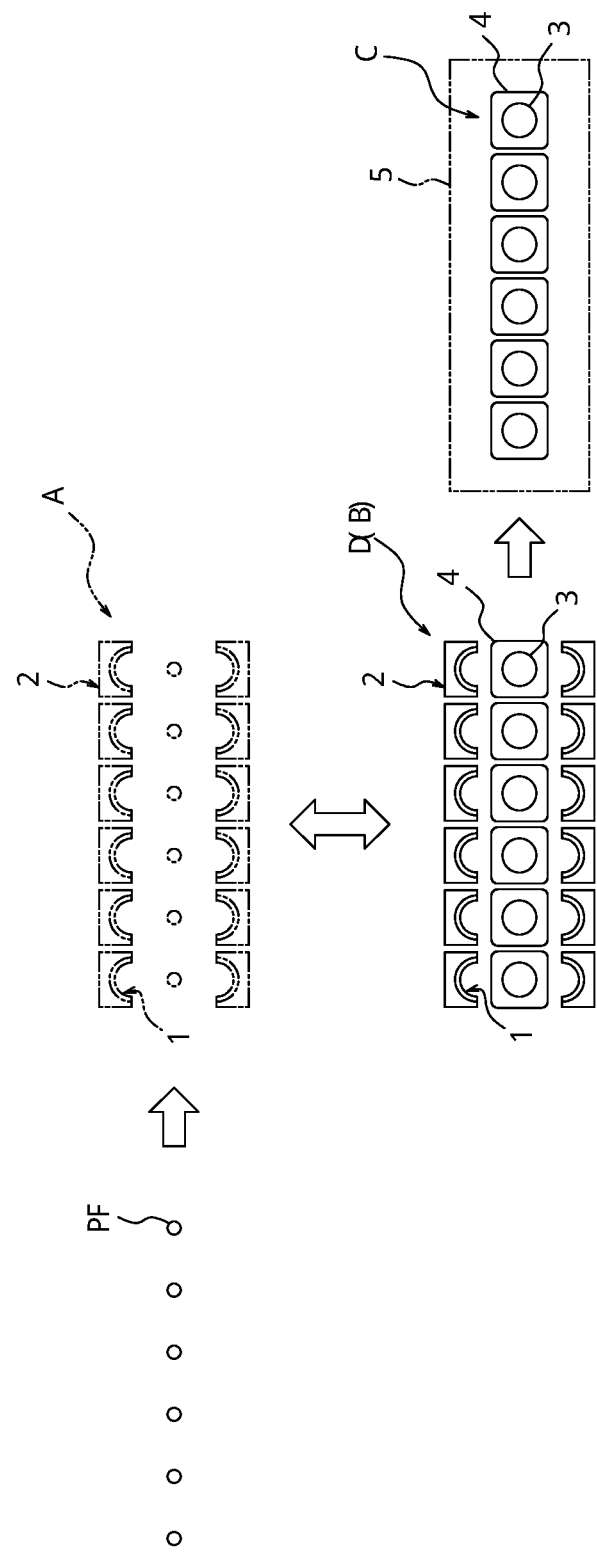

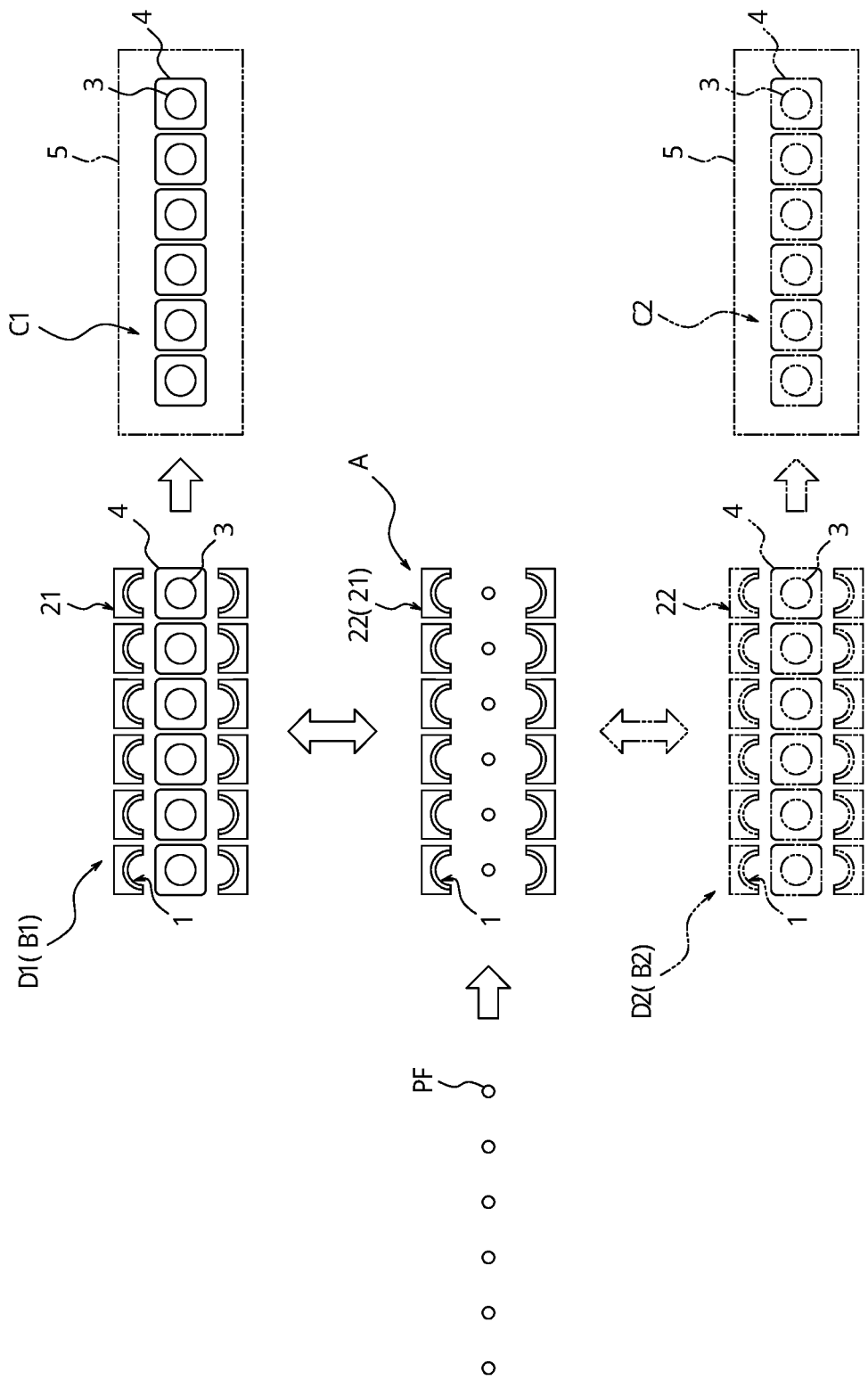

METHOD OF MANUFACTURING CONTAINER BY LIQUID BLOW MOLDING

TECHNICAL FIELD

The present disclosure relates to a method of manufacturing a container by liquid blow molding.

BACKGROUND

Resin-made containers such as bottles made of polypropylene (PP) and bottles made of polyethylene terephthalate (PET) are used to contain, as content fluids, various liquids such as beverages, cosmetics, medicines, detergents, and shampoos. A container body constituting such a container is typically manufactured by blow molding a preform formed of a thermoplastic resin material such as the above-mentioned materials.

For example, the following container manufacturing method is known as described in JP 2016-32921 A (PTL 1): In liquid blow molding, a content fluid to be contained in a container is supplied into a preform as a pressurization medium and a container body is manufactured. This eliminates the need for a step of filling the molded container body with the content fluid, and simplifies the manufacturing process and the molding and filling line.

CITATION LIST

Patent Literature

PTL 1: JP 2016-32921 A

SUMMARY

Technical Problem

In the case of manufacturing the container body by liquid blow molding in this way, when taking the molded container body out of the mold and conveying the container body to a capping position at which the mouth part of the container body is sealed, the liquid in the container body needs to be kept from spilling from the mouth part.

To prevent such spilling of the liquid, a cap may be attached (capping) before taking the container body out of the mold, as described in PTL 1. This, however, is likely to require a complex manufacturing device.

It could therefore be helpful to provide a method of manufacturing a container by liquid blow molding with which, when conveying a liquid blow molded container body from a mold to a capping position, spilling of the liquid from the mouth part of the container body can be reduced.

Solution to Problem

A method of manufacturing a container by liquid blow molding according to the present disclosure comprises: a liquid blow molding step of supplying a pressurized liquid to inside of a preform placed in a mold, and molding the preform into a container body containing the liquid; a placement step of placing the container body in a cup for containing a bottom part of the container body, at a mold opening position of the mold; and a conveyance step of conveying the cup holding the container body from the mold opening position to a capping position.

Preferably, in the method of manufacturing a container by liquid blow molding according to the present disclosure, the mold includes a pair of body split molds that open in a horizontal direction, and a bottom mold located below the body split molds or on an inner side of a lower part of the body split molds, and in the placement step, the bottom mold is opened in a state in which the body split molds are closed, the cup is placed to contain the exposed bottom part of the container body, and then the body split molds are opened.

Preferably, in the method of manufacturing a container by liquid blow molding according to the present disclosure, in the placement step, the mold is opened in a state in which the container body is grasped by a grasping device, and the cup is placed to contain the bottom part of the container body.

Preferably, the method of manufacturing a container by liquid blow molding according to the present disclosure comprises a mold sliding step of sliding the mold holding the container body to a position different from a position of the mold at which the liquid blow molding step is performed, after the liquid blow molding step and before the placement step.

Advantageous Effect

It is thus possible to provide a method of manufacturing a container by liquid blow molding with which, when conveying a liquid blow molded container body from a mold to a capping position, spilling of the liquid from the mouth part of the container body can be reduced.

BRIEF DESCRIPTION OF THE DRAWINGS

In the accompanying drawings:

FIG. 2 is a diagram schematically illustrating the state in each step illustrated in FIG. 1;

FIG. 5 is a diagram illustrating a procedure of a method of manufacturing a container by liquid blow molding according to another one of the disclosed embodiments;

FIG. 6 is a diagram schematically illustrating the state in each step illustrated in FIG. 5; and FIG. 7 is a diagram schematically illustrating the state in each step of a method of manufacturing a container by liquid blow molding according to yet another one of the disclosed embodiments.

DETAILED DESCRIPTION

A method of manufacturing a container by liquid blow molding according to one of the disclosed embodiments is described in detail below, with reference to drawings.

Figure 1:
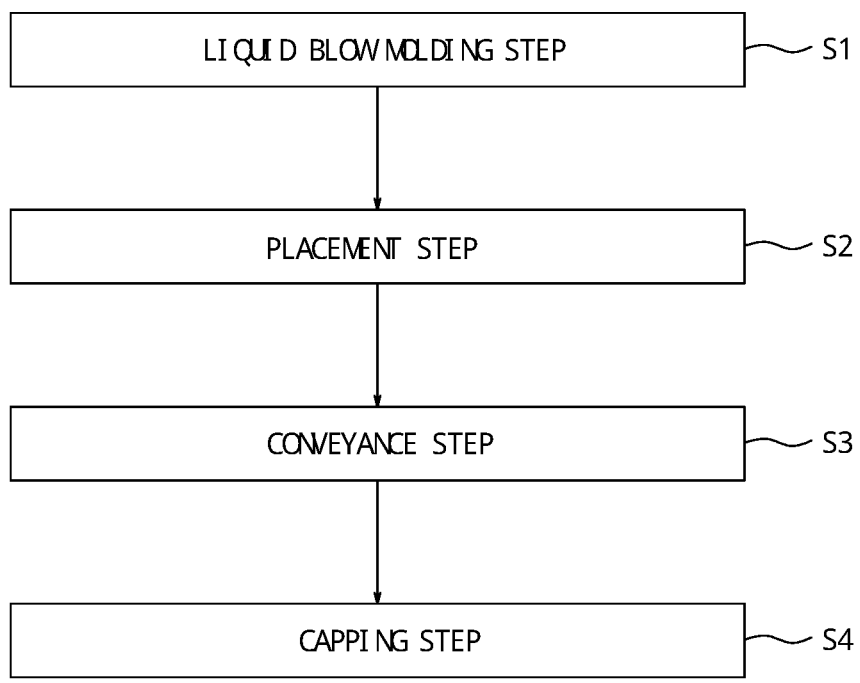
FIG. 1 is a diagram illustrating a procedure of a method of manufacturing a container by liquid blow molding according to one of the disclosed embodiments.

A method of manufacturing a container according to this embodiment includes a liquid blow molding step S1, a placement step S2, a conveyance step S3, and a capping step S4, as illustrated in FIG. 1.

A batch-type mold 2 having a plurality of (six in the drawing) cavities 1 arranged in series is used in this embodiment, as illustrated in FIG. 2. A plurality of preforms PF are simultaneously conveyed and placed in the opened mold 2, and mold clamping is conducted and the liquid blow molding step S1 is performed. Following this, the placement step S2 of placing a plurality of molded container bodies 3 in cups 4 is performed. The conveyance step S3 of conveying the cups 4 holding the container bodies 3 is then performed. The capping step S4 of capping the plurality of container bodies 3 simultaneously or individually (sequentially) using a capper 5 is then performed.

In the liquid blow molding step S1, first, the preforms PF made of a resin are placed in the cavities 1 of the mold 2 for blow molding. The preforms PF can be obtained, for example, through injection molding, compression molding, direct blow molding (extrusion blow molding), extrusion molding, or the like using, as raw material, a thermoplastic resin such as polypropylene (PP) or polyethylene terephthalate (PET). Each preform PF includes a bottomed cylindrical barrel part and a mouth part connected to the barrel part. After preheating the preform PF using a heater or the like to a predetermined temperature at which stretchability is developed, the barrel part of the preform PF can be placed in the cavity 1 of the mold 2. At this time, the movement of the preform PF is stopped.

At a position A at which the liquid blow molding step S1 is performed, a nozzle unit is provided above the mold 2, and connected to a pressurized liquid supplier. The pressurized liquid supplier is capable of supplying a liquid pressurized to a pressure suitable for liquid blow molding into the plurality of preforms PF placed inside the respective cavities 1 of the mold 2, through the nozzle unit. For example, the pressurized liquid supplier may include a plunger pump driven by a servomotor.

The nozzle unit is movable in the vertical direction, and can come into contact with the upper surface of the mold 2. The nozzle unit includes a nozzle that is fitted into the mouth part of the preform PF placed in each cavity 1 of the mold 2 when the nozzle unit comes into contact with the upper surface of the mold 2. The pressurized liquid can be supplied from the pressurized liquid supplier into the preform PF through this nozzle.

After opening the mold 2 and placing each preform PF in the cavity 1, mold clamping is performed. The nozzle of the blow molding device is then connected to the mouth part of the preform PF exposed from the mold 2, and the pressurized liquid is supplied to the inside of the preform PF. Thus, the preform PF can be molded into a container body 3 that is shaped along the inner surface of the cavity 1 and contains the liquid.

In the liquid blow molding step S1, biaxial stretch blow molding using a stretching rod may be performed. The pressurized liquid is the content fluid to be contained in the container body 3, and is a liquid such as a beverage, cosmetics, a medicine, a detergent, or a shampoo.

The placement step S2 is a step of, after the liquid blow molding step S1, placing the container body 3 in the cup 4 capable of containing the bottom part of the container body 3, at a mold opening position B (the same position as the position A at which the liquid blow molding step S1 is performed in this embodiment) of the mold 2. The cup 4 has a shape that can contain the bottom part of the container body 3 after the liquid blow molding and hold the container body 3 in an erecting position with the opening of the mouth part facing upward. In this example, the cup 4 includes a side wall 4a that surrounds the side surface of the container body 3 and a bottom wall 4b connected to the lower part of the side wall 4a, as illustrated in FIG. 3D. However, the cup 4 is not limited to such. To enhance stability when holding the container body 3 and prevent the container body 3 from wobbling, the inner surface of the cup 4 is preferably shaped to conform to the outer shape of the container body 3. The term "mold opening position" indicates the position of the mold 2 in a planar view when opening body split molds 2a, and does not denote the position in the perpendicular direction (vertical direction). As long as the container body 3 is placed in the cup 4 at the position at which the mold 2 is opened in a planar view, for example, the container body 3 may be conveyed downward with the mouth part of the container body 3 being grasped by a grasping device, and placed in the cup 4 located below the mold 2.

FIGS. 3A to 3D are schematic side views illustrating the placement step S2. As illustrated in FIGS. 3A to 3D, the mold 2 may include, for example, a pair of body split molds 2a openable in the horizontal direction and a bottom mold 2b located below the body split molds 2a. The body split molds 2a have an inner surface shape mainly corresponding to the outer shape of the barrel part of the container body 3, and the bottom mold 2b has an inner surface shape mainly corresponding to the outer shape of the bottom part of the container body 3. The mold 2 may have, for example, a structure in which the bottom mold 2b is located on the inner side of the lower part of the body split molds 2a. In other words, the bottom mold 2b may not project downward from the body split molds 2a.

Figure 3A:
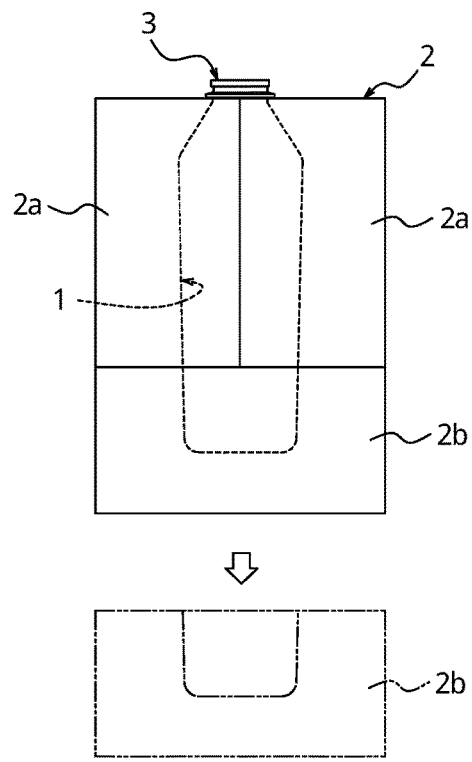
FIG. 3A is a side view illustrating the state in the placement step.
Figure 3B:
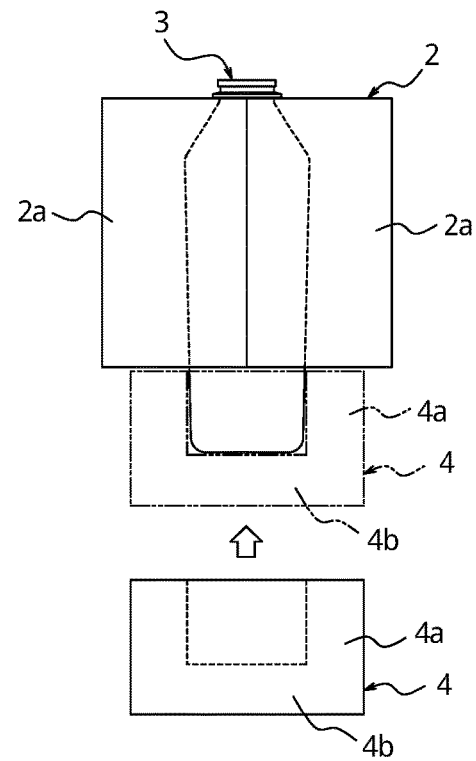
FIG. 3B is a side view illustrating the state in the placement step.
Figure 3C:
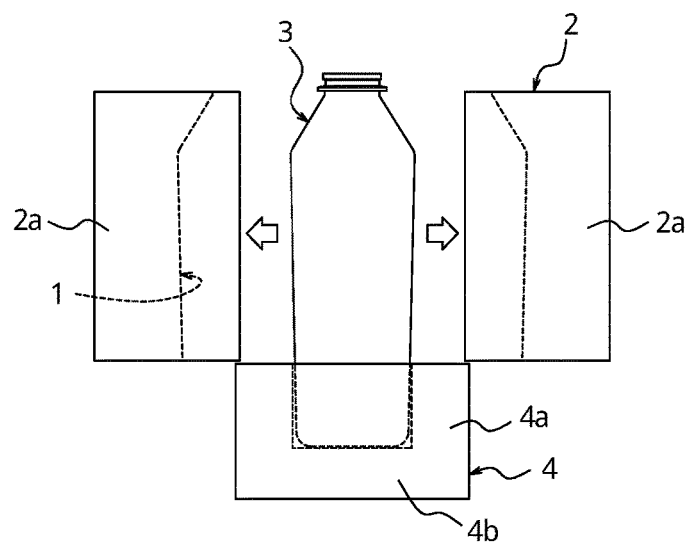
FIG. 3C is a side view illustrating the state in the placement step.
Figure 3D:
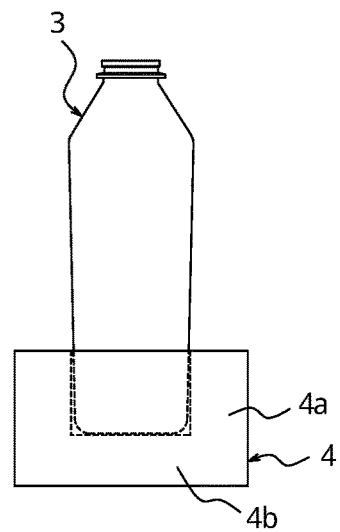
FIG. 3D is a side view illustrating the state in the placement step.

When the liquid blow molding step S1 ends, the body split molds 2a and the bottom mold 2b are in a closed state, as indicated by solid lines in FIG. 3A. In the placement step S2, the bottom mold 2b is opened in a state in which the body split molds 2a are closed to expose the bottom part of the container body 3, as indicated by chain double-dashed lines in FIG. 3A. Next, as illustrated in FIG. 3B, the bottom part of the container body 3 is contained in the cup 4 by inserting the exposed bottom part of the container body 3 into the upper opening of the cup 4. After this, as illustrated in FIG. 3C, the body split molds 2a are opened right and left, and the container body 3 is held by the cup 4. Thereafter, as illustrated in FIG. 3D, the container body 3 held by the cup 4 is conveyed to a capping position C (see FIG. 2) at which the capping step S4 is performed, by a conveyor or the like (conveyance step S3). During the conveyance, the container body 3 has the side surface supported by the side wall 4a of the cup 4 and the bottom surface supported by the bottom wall 4b of the cup 4, and thus is conveyed in a stable position. The conveyance of the cup 4 in the conveyance step S3 is not limited to conveyance in the horizontal direction, and may include conveyance in the vertical direction or conveyance in an obliquely upward/downward direction.

In the capping step S4, the mouth part of the container body 3 is sealed with a cap such as a closure cap, at the capping position C. The sealing with the closure cap may be performed by screwing using a threaded portion, or by fitting using an undercut shape. Instead of the closure cap, an attachment cap of a discharge device with a pump, an attachment cylindrical portion of a discharge plug, or the like may be attached to the mouth part of the container body 3. The device for performing the capping step S4, such as the capper 5, is not limited to batch type, and may be rotary type.

As described above, the method of manufacturing a container by liquid blow molding according to this embodiment includes: a liquid blow molding step S1 of supplying a pressurized liquid to the inside of a preform PF placed in a mold 2, and molding the preform PF into a container body 3 containing the liquid; a placement step S2 of placing the container body 3 in a cup 4, at a mold opening position B of the mold 2; and a conveyance step S3 of conveying the cup 4 holding the container body 3 from the mold opening position B to a capping position C.

With the method of manufacturing a container by liquid blow molding according to this embodiment, the container body 3 can be conveyed from the mold opening position B of the mold 2 to the capping position C in a stable state of being held by the cup 4. This reduces the possibility that the content fluid spills from the opening of the mouth part of the container body 3 during the conveyance. Moreover, a complex manufacturing device required in the case of capping the container body 3 before taking it out of the mold 2 is unnecessary.

Figure 4A:
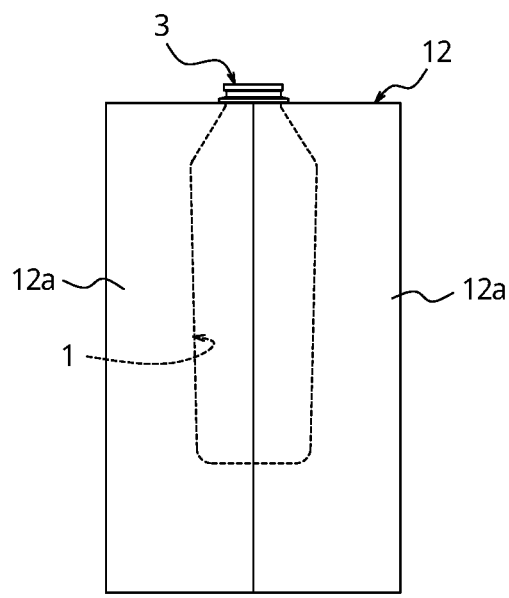
FIG. 4A is a side view illustrating the state in the placement step as another example.
Figure 4B:
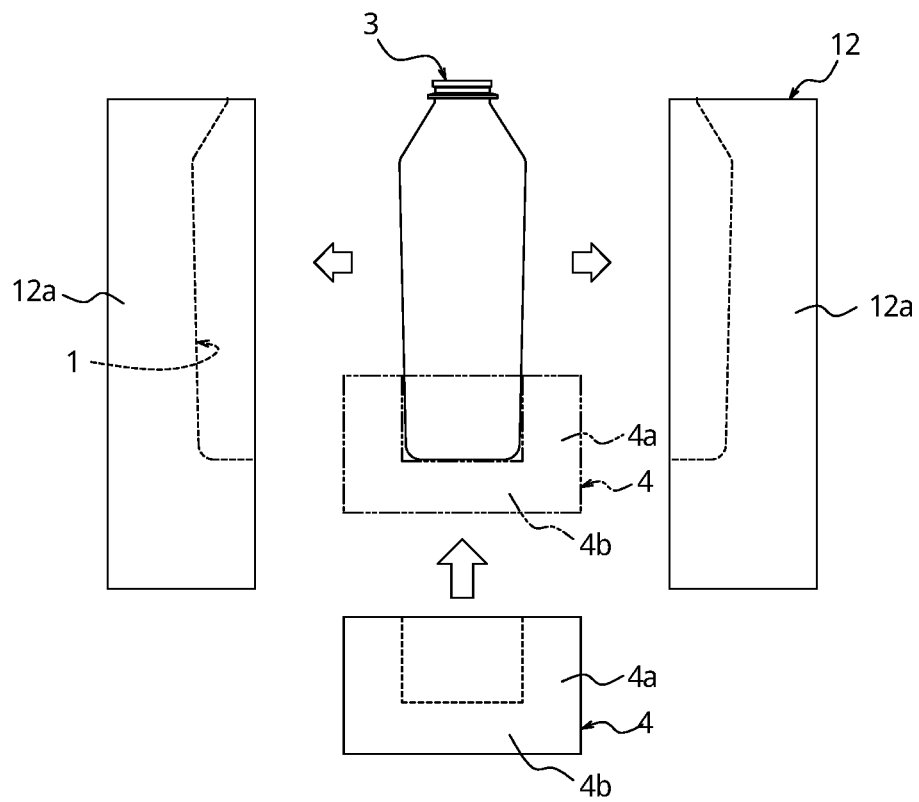
FIG. 4B is a side view illustrating the state in the placement step as another example.

As an alternative to the mold 2, a mold 12 including only a pair of body split molds 12a openable right and left with no bottom mold may be used, as illustrated in FIGS. 4A and 4B. In this case, mold opening is performed in a state in which the mouth part of the container body 3 is grasped by a grasping device or the like, and the cup 4 is placed. For example, the grasping device is configured to grasp the upper side of the neck ring of the mouth part and support the flange formed on the upper side of the neck ring from below. The part of the container grasped by the grasping device is not limited. Instead of the grasping device, a holding device that holds the container simply by being hooked on the neck ring or the flange above the neck ring may be used.

As another alternative to the mold 2, a structure including body split molds and a bottom mold located on the inner side of the lower part of the body split molds so that the bottom mold covers only the bottom surface of the container body 3 without covering the side surface of the container body 3 may be used (not illustrated). In this case, the body split molds are opened in a state in which the mouth part of the container body 3 after the liquid blow molding is grasped by a grasping device or the like, and the container body 3 is placed in the cup 4. Each of the molds described above may be provided with a support pin movable up and down in the mold, and support the bottom surface of the preform by the tip of the support pin.

In the placement step S2, the cup 4 may be moved upward from below the mold 2 to contain the bottom part of the container body 3 in the cup 4, or the mold 2 or the grasping device holding the container body 3 may be moved downward to insert the bottom part of the container body 3 into the cup 4 from above. The cup 4 may be placed on the conveyor beforehand, or placed on the conveyor after the container body 3 is held by the cup 4. The conveyance direction and conveyance form of the cup 4 are not limited. The bottom mold 2b of the mold 2 may be used as a cup for holding the container body 3. In this case, the cup 4 need not be prepared, and equipment and the like for placing the cup 4 at the bottom part of the container body 3 are unnecessary.

Another one of the disclosed embodiments is described below. Parts having the same basic functions as those in the foregoing embodiment are given the same reference signs in the drawings, and their description is omitted.

FIGS. 5 and 6 illustrate a method of manufacturing a container by liquid blow molding according to another one of the disclosed embodiments. In this embodiment, a mold sliding step S5 is performed after the liquid blow molding step S1 and before the placement step S2. The mold sliding step S5 is a step of sliding the mold 2 (before mold opening) holding the container bodies 3 after the liquid blow molding, to a position D different from the position A at which the liquid blow molding step S1 is performed. In this embodiment, mold opening is performed at the position D after the mold sliding step S5. That is, the position D is the same as the mold opening position B in this embodiment.

First, at the position A at which the liquid blow molding step S1 is performed, the mold 2 is opened and each preform PF is placed in the cavity 1, and the mold is clamped and liquid blow molding is performed. After this, in this embodiment, the mold 2 holding each container body 3 is slid and moved to the mold opening position B (position D) (mold sliding step S5). In the mold sliding step S5, after removing the bottom mold 2b, the body split molds 2a in a closed state holding the container body 3 may be slid to the mold opening position B (position D). After this, the placement step S2 is performed to contain and hold the container body 3 in the cup 4, the conveyance step S3 is performed to convey the cup 4 to the capping position C, and the capping step S4 is performed, as in the foregoing embodiment. As a structure for sliding the mold 2, for example, a guide rail may be provided above, below, or lateral to the mold 2 so as to move the mold 2 along the guide rail. The sliding direction is not limited. In this example, the sliding direction is the horizontal direction orthogonal to the preform PF conveyance direction. The position D can be such a position that does not overlap, in the vertical direction, with the nozzle unit of the blow molding device and the device for conveying the preform PF to the mold 2.

As described above, the method of manufacturing a container by liquid blow molding according to this embodiment includes, between the liquid blow molding step S1 and the placement step S2, a mold sliding step S5 of sliding the mold 2 to a position D different from the position A at which the liquid blow molding step S1 is performed.

With the method of manufacturing a container by liquid blow molding according to this embodiment, the placement step S2 of placing the container body 3 in the cup 4 can be performed at such a position that does not overlap, in the vertical direction, with equipment such as the nozzle unit of the blow molding device and the preform conveyance device. This eases the placement step S2, because the method of placing the container body 3 in the cup 4 is not restricted by the nozzle unit and the like.

FIG. 7 illustrates a method of manufacturing a container by liquid blow molding according to yet another one of the disclosed embodiments. In this embodiment, the liquid blow molding step S1 is performed by alternately using two molds 21 and 22 respectively slidable to different positions D1 and D2, as illustrated in FIG. 7. The position A at which the liquid blow molding step S1 is performed is, for example, on the preform PF conveyance path, and the two molds 21 and 22 are respectively slidable to the position D1 after first sliding and the position D2 after second sliding that are on both sides of the position A at which the liquid blow molding step S1 is performed. In this embodiment, the position D1 after the first sliding and the position D2 after the second sliding respectively coincide with a first mold opening position B1 of the mold 21 and a second mold opening position B2 of the mold 22 at which the placement step S2 is performed.

While one mold 21 of the two molds 21 and 22 is at the position D1 (B1) after the first sliding, the liquid blow molding step S1 is performed using the other mold 22 at the position A, as indicated by solid lines in FIG. 7. Moreover, in a state in which the mold 21 is at the position D1 (B1), the mold is opened and the placement step S2 is performed. Following this, the conveyance step S3 is performed to convey the container body 3 from the position D1 (B1) to a capping position C1, and the capping step S4 is performed. Although the capping position C1 is a position at a predetermined distance from the position D1 (B1) of the mold 21 in a direction parallel to the preform PF conveyance direction in this embodiment, the capping position C1 is not limited to such. The mold 21 whose cavity 1 has been emptied as a result of the conveyance of the container body 3 is then moved from the position D1 (B1) to the position A. Simultaneously with this or before the mold 21 is moved from the position D1 (B1) to the position A, the mold 22 that has undergone the liquid blow molding step S1 is moved from the position A to the position D2 (B2) after the second sliding in a state of holding the container body 3 after the liquid blow molding, as indicated by chain double-dashed lines in FIG. 7 (mold sliding step S5). Then, in a state in which the mold 22 is at the position D2 (B2), the mold is opened and the placement step S2 is performed. Following this, the conveyance step S3 is performed to convey the container body 3 from the position D2 (B2) to a capping position C2, and the capping step S4 is performed. Although the capping position C2 is a position that is at a predetermined distance from the position D2 (B2) of the mold 22 in a direction parallel to the preform PF conveyance direction and is different from the capping position C1 in this embodiment, the capping position C2 is not limited to such. For example, the container body 3 liquid blow molded using the mold 21 and the container body 3 liquid blow molded using the mold 22 may be capped using the common capper 5. That is, the capping position C1 and the capping position C2 may be the same position, and the capping positions are not limited to the positions C1 and C2 in the drawing and may be changed as appropriate. Further, the liquid blow molding step S1 is performed using the mold 21 at the position A. The mold 22 whose cavity 1 has been emptied as a result of the conveyance of the container body 3 is then moved from the position D2 (B2) to the position A. Simultaneously with this or before the mold 22 is moved from the position D2 (B2) to the position A, the mold 21 that has undergone the liquid blow molding step S1 is moved from the position A to the position D1 (B1) after the first sliding in a state of holding the container body 3 (mold sliding step S5'). By repeating such steps, containers can be manufactured continuously.

As described above, in this embodiment, the liquid blow molding step S1 can be performed using the two molds 21 and 22 alternately. This enhances the manufacturing efficiency of the container bodies 3. In addition, in each of the mold sliding steps S5 and S5', the container body 3 is conveyed in a state of being held by the mold 21 or 22, so that the container body 3 is in a stable position as in the case where it is conveyed using the cup 4, and the internal liquid (content fluid) is unlikely to spill from the opening of the mouth part. This reduces the possibility that the content fluid spills from the opening of the mouth part of the container body 3 during the conveyance. In the case of neck conveyance, i.e. in the case of conveying the container body 3 while holding the mouth part of the container body 3, there is a possibility that the container body 3 swings with the held mouth part as the fulcrum and the content fluid spills out or, especially when the container is lightweight (thin), its barrel part is deformed due to such swinging and the like. According to this embodiment, content fluid spilling, barrel part deformation, etc. can be suppressed by conveying the container body 3 in a state of being held by the cup 4. Furthermore, since a deformation of the barrel part of the container body 3 during the conveyance is suppressed, for example, a capping failure caused by tilting of the axis of the mouth part due to a deformation of the barrel part of the container body 3 can also be prevented.

The present disclosure is not limited to the embodiments described above, and various changes can be made without departing from the scope of the present disclosure.

For example, although the mold 2 has six cavities 1 arranged in series in the foregoing embodiments, the number and arrangement of the cavities 1 may be freely set as long as the mold 2 has at least one cavity 1. The sliding direction of the mold 2 is not limited to a direction orthogonal to the preform PF conveyance direction, and may be any direction such as a serial direction (i.e. on the same straight line).

REFERENCE SIGNS LIST 1 cavity
2 mold
2a body split mold
2b bottom mold
3 container body
4 cup
4a side wall
4b bottom wall
5 capper
12 mold
12a body split mold
A liquid blow molding position
B mold opening position
B1 first mold opening position
B2 second mold opening position
C capping position
D position after sliding
D1 position after first sliding
D2 position after second sliding
PF preform
S1 liquid blow molding step
S2 placement step
S3 conveyance step
S4 capping step
S5 sliding step

The invention claimed is:
1. A method of manufacturing a container by liquid blow molding, the method comprising: a liquid blow molding step of supplying a pressurized liquid to inside of a preform placed in a mold, and molding the preform into a container body containing the liquid; a placement step of placing the container body in a cup for containing a bottom part of the container body, at a mold opening position of the mold; and a conveyance step of conveying the cup holding the container body from the mold opening position to a capping position wherein the mold includes a pair of body split molds that open in a horizontal direction, and a bottom mold located below the body split molds or on an inner side of a lower part of the body split molds, and in the placement step, the bottom mold is opened in a state in which the body split molds are closed, the cup is placed to contain the exposed bottom part of the container body, and then the body split molds are opened.

2. The method of manufacturing a container according to claim 1, comprising
a mold sliding step of sliding the mold holding the container body to a position different from a position of the mold at which the liquid blow molding step is performed, after the liquid blow molding step and before the placement step.

3. The method of manufacturing a container according to claim 1,
   wherein in the placement step, the mold is opened in a state in which the container body is grasped by a grasping device, and the cup is placed to contain the bottom part of the container body.

4. The method of manufacturing a container according to claim 3, comprising
   a mold sliding step of sliding the mold holding the container body to a position different from a position of the mold at which the liquid blow molding step is performed, after the liquid blow molding step and before the placement step.

\* \* \* \* \*